US008402646B2

(12) United States Patent
Droz (10) Patent No.: US 8,402,646 B2
(45) Date of Patent: Mar. 26, 2013

(54) METHOD OF MANUFACTURING ELECTRONIC CARDS

(75) Inventor: François Droz, Corecelles (CH)

(73) Assignee: NagraID S.A., La Chaux-de-Fonds (CH)

( * ) Notice: Subject to any disclaimer, the term of this patent is extended or adjusted under 35 U.S.C. 154(b) by 2 days.

(21) Appl. No.: 12/979,620

(22) Filed: Dec. 28, 2010

(65) Prior Publication Data

US 2011/0154662 A1    Jun. 30, 2011

(30) Foreign Application Priority Data

Dec. 28, 2009  (EP) ..................................... 09180782

(51) Int. Cl.
*H05K 3/30*   (2006.01)
(52) U.S. Cl. ................. 29/832; 29/830; 29/846; 29/852
(58) Field of Classification Search ............... 29/830, 29/832, 846, 852; 438/125
See application file for complete search history.

(56) References Cited

U.S. PATENT DOCUMENTS

| 4,625,102 | A | 11/1986 | Rebjock et al. | |
| 7,710,732 | B2 * | 5/2010 | Droz .............................. | 361/728 |
| 2006/0124350 | A1 * | 6/2006 | Droz .............................. | 174/260 |
| 2006/0191711 | A1 * | 8/2006 | Cho et al. ...................... | 174/260 |

FOREIGN PATENT DOCUMENTS

| DE | 196 01 389 A1 | 7/1997 |
| EP | 1 559 068 A1 | 8/2005 |
| WO | 2004/034320 A1 | 4/2004 |

OTHER PUBLICATIONS

European Search Report issued in corresponding application No. EP 09 18 0782, completed May 12, 2010.
Exhibit A, Espacenet Bibliographic data for WO 2004/034320 A1, published Mar. 14, 2012.

* cited by examiner

*Primary Examiner* — Carl Arbes
(74) *Attorney, Agent, or Firm* — Griffin & Szipl, P.C.

(57) ABSTRACT

A method of manufacturing complex electronic cards is provided, each card including an electronic device or assembly formed of a first electronic unit at least partially arranged in a window in a solid bottom layer of the card and a second electronic unit, incorporated in the body of the card, at least partially formed by resin provided on the solid bottom layer. In order to prevent the resin from flowing into a slit between the lateral wall of the window and the second unit inserted therein, a protective film is arranged to cover the edge of the rear face of the first unit and a zone peripheral to the aperture in the solid layer. The electronic device or assembly is first formed and then placed on the bottom solid layer. The protective film is arranged between the two units after or when the electronic device or assembly is formed.

31 Claims, 4 Drawing Sheets

METHOD OF MANUFACTURING ELECTRONIC CARDS

This application claims priority from European Patent Application No. 09180782.6 filed Dec. 28, 2009, the entire disclosure of which is incorporated herein by reference.

FIELD OF THE INVENTION

The present invention concerns a method of manufacturing complex electronic cards each including a first electronic unit, at least partially arranged in a window in a solid layer of the card, and a second electronic unit electrically connected to the first electronic unit and incorporated in an internal layer formed by a filler material which covers at least one of the surfaces of the second electronic unit. In particular, the filler material is a resin, provided in a non solid state during the manufacturing process or a resin provided in the form of at least partially melted hot melt sheets, so as form an internal layer of the card. It will be noted that the internal layer formed by the filler material can contain other solid structures or elements, in particular positioning or filler structures for the internal layer.

"Electronic card" means a bank type card and also other devices in various forms, particularly an electronic tag or a portable electronic device.

BACKGROUND OF THE INVENTION

A method is already known from EP Patent No. 1,559,068 for manufacturing electronic modules which each include two insulating sheets defining the external faces thereof, at least one electronic element having an external surface that substantially touches one of the external surfaces of the electronic module and an electronic circuit arranged between the two insulating sheets and connected to the electronic element. This method provides the following steps:
 providing at least a first insulating sheet including a window for housing the electronic element;
 inserting the electronic instrument in the window of the first insulating sheet, the electronic element being provided with conductive connection pads arranged on an inner surface opposite to the external surface thereof;
 superposing an adhesive protective film that extends at least into the area between the electronic element and the edges of the window, the protective film holding the electronic element in the window and closing any slit between the electronic element and the lateral wall of the window;
 placing the electronic circuit in a zone close to the window and connecting the electronic element to the electronic circuit through a window provided or made in the protective film and located opposite the conductive connection paths;
 depositing a filler material on the set of elements already provided and superposing a second insulating sheet on the filler material;
 pressing or laminating the assembly produced by the preceding steps, the filler material forming a layer compensating for any surface contours resulting from assembling the electronic module.

The manufacturing method described above solves an important problem, namely, preventing the filler material, generally formed by a resin which is in a viscous liquid state when pressure is applied to form the electronic module, from flowing into any slit between the electronic element and the lateral wall of the window in which it is arranged, so as to prevent the resin extending at least partially onto the visible external surface of the electronic element. However, the manufacturing method presents a problem in relation to the sequence of steps, in particular the fact that the electrical connection between the visible electronic element and the internal electronic unit is achieved once the electronic element has been inserted in a window in an external insulating layer of the card being manufactured and the adhesive protective layer is in place. This sequence of steps raises a practical problem given that card manufacturing equipments or facilities are not generally equipped with a device for welding or assembling various electronic units. Indeed, generally, the various electronic circuits and elements are first assembled to form electronic devices and then these electronic devices are taken to a conventional card manufacturing equipment or facility in which the various materials used to form the cards are provided and processed in an appropriate manner to obtain high quality electronic cards into which the electronic devices are respectively incorporated. The aforecited Patent of the prior art does not propose temporally separating production of the electronic devices from the manufacture of the cards incorporating these electronic devices. Although the method described in the aforecited document can be implemented and used to obtain complex electronic cards, it has a major drawback for those skilled in the art specialised in manufacturing finished electronic cards or inlets, who prefer to separate the production of the electronic devices from the card forming process.

It is an object of the present invention to overcome the major drawback of the prior art method mentioned above.

SUMMARY OF THE INVENTION

The electronic card manufacturing method according to the invention is mainly characterized in that the electronic assembly or device, formed by at least a first electronic unit provided in a window in a solid layer of the card and by a second electronic unit arranged in an inner layer or the body of the card, is manufactured first, prior to production of the electronic cards; i.e., before the solid layers and other materials forming the body of the card are added. Thus, the electronic device incorporated into each card is made in a preliminary step, in accordance with a conventional process. In order to do this, various ways of implementing the card manufacturing method are proposed. In particular, according to the invention the protective film is formed of several parts or a single part with at least one slit.

If the protective film is in several parts, these parts have complementary profiles that can cover the external edge of a rear face of the first electronic unit, while extending into the entire peripheral zone of the first electronic unit and defining a window allowing the electrical connection between the first and second electronic units to pass through. This window thus has smaller dimensions than those of the first electronic unit. Thus, once the electronic device has been taken to the card manufacturing equipment or facility and the first electronic unit has been at least partially inserted into a window in the first solid layer, the protective film can properly cover any slit between the lateral wall of the window and the first electronic unit.

If the protective film is formed of a single part with at least one slit, this slit is either a through slit between a central window in the film and the outer edge thereof, the slit thus being able to be moved aside to allow the electrical connection to pass inside the central window, or, when the slit is not a through slit, it is arranged such that the first or second electronic unit can pass through the central window in the protective film by moving aside the parts of the protective film located at the edge of the window.

The electronic card manufacturing method according to the invention includes three main implementation modes. In a first implementation mode of the invention, as described below according to a first illustrative embodiment of the invention, the electronic device, formed of at least first and second pre-assembled electronic units, is first of all brought to the card manufacturing equipment or facility where the first electronic unit is placed in a window in a first solid layer. Next, a protective film of the type described above is provided and arranged so as to cover essentially any slits that may exist between the first electronic unit and the lateral wall of the window.

According to the second implementation mode, as described below in accordance with a second illustrative embodiment of the invention, the electronic assembly or device is first of all made and then, before the electronic device is provided on a first solid layer and the first electronic unit is arranged in the window in the solid layer, the protective film is assembled to the electronic device so that the electrical connection is located in a window defined by the protective film and so that the latter is thus located between the first and second electronic units. Next, the pre-assembled electronic device and protective film are taken to the card manufacturing equipment or facility where the solid layer is provided, the first electronic unit is conveniently inserted in the aperture provided in the solid layer, and the protective film is applied across a zone peripheral to the window and, if this has not been previously done, at least against the lateral surface and/or the outer edge of a rear face of the first unit. In a variant of this second embodiment, a protective film is first of all assembled to the first unit by applying the film at least against the outer edge of a rear face of the first unit, then an electrical connection is established with the second electronic unit through an aperture in the film before the protective film pre-assembled with the electronic device is taken to a card manufacturing equipment or facility where the first solid layer is added.

According to the third implementation mode of the invention, as described with respect to a sixth illustrative embodiment of the invention, firstly the electronic assembly or device is manufactured, formed of at least the first and second electrically connected electronic units, and then a structure including a protective film having at least one window, which has smaller dimensions than those of the first electronic unit and has flaps at the periphery thereof, separated by slits, and a first solid layer having at least one window for at least partially receiving the first electronic unit. The protective film is assembled to the first solid layer with the at least one aperture centred on the at least one window. Next, the structure and the electronic device are taken to a equipment or facility and the first electronic unit is placed opposite the aperture, then the first unit is pushed into the window by folding the flaps towards the lateral wall of the aperture until the flaps are released and then moved back up at least partially in the direction of the general plane of the protective film. Next, the first unit is moved back up in the direction of the aperture and the flaps are at least partially applied against the lateral surface and/or a rear face of the first unit, so as to close any slits between the lateral wall of the window and the first unit, the electrical connection passing through the aperture.

Finally, in the method according to the invention a filler material is provided on the protective film, in particular a resin, which is at least partially in a non solid state when a layer or body of the cards is at least partially formed by the filler material, the latter at least partially covering the electrical connection of the electronic assembly or device.

It will be noted that, in a variant, the protective film has an adhesive surface that holds it in place and also, in a subsequent step of depositing a filler material at least partially covering the electronic connection, prevents the filler material from infiltrating underneath the protective film and thus flowing into the window. Other variants for holding the protective film in place can be envisaged. For example, the solid layer may have an adhesive top surface in the area provided for the protective film. In another variant, the protective film is thermally welded to the solid layer, particularly in several specific areas. Various other variants of the manufacturing method according to the invention form the subject of additional illustrative embodiments of the invention.

Thus, in accordance with the first illustrative embodiment of the present invention, a method of manufacturing electronic cards is provided, wherein each card includes at least a first electronic unit at least partially arranged in a window in a solid layer of the card, and a second electronic unit electrically connected to the first electronic unit, wherein the method includes the following steps in series: (A) forming an electronic device, or an electronic assembly, by making an electrical connection at least between a first electronic unit and a second electronic unit; (B) providing a first solid layer having at least one window, wherein the at least one window is provided to at least partially receive the first electronic unit, and placing the first electronic unit of the electronic device, or the electronic assembly, in the at least one window; (C) providing a first protective film formed of several parts having respective profiles that, when assembled, define a first aperture into which the electrical connection passes, wherein the first aperture has smaller dimensions than those of the first electronic unit, or providing a second protective film formed of a single part having at least one slit starting from a second aperture made in the single part, wherein the dimensions of the second aperture are smaller than those of the first electronic unit, and placing the first protective film, or the second protective film, so as to cover the first solid layer in a zone peripheral to the at least one window and at least a lateral surface of the first electronic unit, to close any slit between the lateral wall of the at least one window and the first electronic unit, or to cover the first solid layer in the zone peripheral to the at least one window and an outer edge of a rear face of the first electronic unit to close any slit between the lateral wall of the at least one window and the first electronic unit; and (D) at least on the protective film, providing a filler material and forming a card layer by the filler material that is at least partially in a non solid phase, wherein the filler material at least partially covers the electrical connection of the electronic device or the electronic assembly.

In accordance with a second illustrative embodiment of the present invention, a method of manufacturing electronic cards is provided, wherein each card includes at least a first electronic unit at least partially arranged in a window in a solid layer of the card, and a second electronic unit electrically connected to the first electronic unit, wherein the method includes the following steps in series: (A) first forming an electronic device, or an electronic assembly, by making an electrical connection at least between a first electronic unit and a second electronic unit, and then providing a protective film having an aperture, or arranged to define the aperture, wherein the dimensions of the aperture are smaller than those of the first electronic unit, and arranging the protective film between the first electronic unit and the second unit with the electrical connection passing through the aperture; (B) providing a first solid layer having at least one window, wherein the at least one window is provided to at least partially receive the first electronic unit, and providing the formed electronic device, or electronic assembly, with the protective film, and placing the first electronic unit in the at least one window and the protective film partially on the first solid layer at a periphery of that at least one window and, when not previously performed, partially against a lateral surface of the first electronic unit, or against an outer edge of a rear face of the first electronic unit, so as to close any slit between the lateral wall of the at least one window and the first electronic unit; and (C) at least on the protective film, providing a filler material and forming a card layer by the filler material that is at least partially in a non solid phase, wherein the filler material at least partially covers the electrical connection of the electronic device or electronic assembly. In accordance with a third illustrative embodiment of the present invention, the second illustrative embodiment is modified so that the protective film is formed of several parts, having respective profiles provided to define, when assembled, the aperture into which the electrical connection passes and the aperture has smaller dimensions than those of the first electronic unit.

In accordance with a fourth illustrative embodiment of the present invention the first illustrative embodiment is modified so that the protective film has the general shape of a slit ring. In accordance with a fifth illustrative embodiment of the present invention, the first illustrative embodiment is modified so that the protective film is formed of two parts, wherein at least one of the two parts is generally U-shaped.

In accordance with a sixth illustrative embodiment of the present invention, a method of manufacturing electronic cards is provided, wherein each card includes at least a first electronic unit at least partially arranged in a window in a solid layer of the card, and a second electronic unit electrically connected to the first electronic unit, wherein the method includes: a plurality of steps that include a first group of steps and a second group of steps in series, wherein the first group of steps include (A) forming an electronic device, or an electronic assembly, by making an electrical connection at least between a first electronic unit and a second electronic unit; and (B) forming a structure including a protective film provided with at least one aperture, wherein the at least one aperture has smaller dimensions than those of the first electronic unit and the at least one aperture has flaps at a periphery thereof, and forming a first solid layer having at least one window that at least partially receives the first electronic unit, wherein the protective film is assembled to the first solid layer with the at least one aperture centered on the at least one window; wherein the first group of steps are followed by the second group of steps, and the second group of steps include in series (C) providing the structure and the electronic device, or the electronic assembly, to a card production equipment or to a card production facility, and placing the first electronic unit opposite the at least one aperture, then pushing the first electronic unit into the at least one window by folding the flaps in a direction of a lateral wall of the at least one aperture until the flaps are released and then move the flaps back up at least partially towards a general plane of the protective film; (D) moving the first electronic unit back up towards the at least one aperture so that the flaps are applied against a lateral surface of the first electronic unit, or a rear face of the first electronic unit, so as to close any slit between the lateral wall of the at least one window and the first electronic unit, wherein the electrical connection passes through the at least one aperture; and (E) at least on the protective film, providing a filler material and forming a card layer by the filler material that is at least partially in a non solid phase, wherein the filler material at least partially covers the electrical connection of the electronic device or electronic assembly. In accordance with a seventh illustrative embodiment of the present invention, the sixth illustrative embodiment is modified so that the protective film and the first solid layer are laminated together. In accordance with an eighth illustrative embodiment of the present invention, the sixth illustrative embodiment is modified so that the protective film initially has a plurality of apertures respectively centered on a plurality of windows in the first solid layer to which the protective film is assembled, wherein the structure is provided for forming a batch of cards, wherein each incorporates one of a plurality of the electronic device or the electronic assembly.

In accordance with a ninth illustrative embodiment of the present invention, the first illustrative embodiment is further modified so that a first part of the filler material is formed by a resin provided underneath the second electronic unit while the second electronic unit is raised relative to the first solid layer or turned onto a top side thereof, and a second part of the filler material is then provided on the second electronic unit that is folded down or turned onto a bottom side thereof so as to be located on the first part of the filler material. In accordance with a tenth illustrative embodiment of the present invention, the first illustrative embodiment is modified so that the filler material is formed by at least one resin, wherein the resin is spread out using a roller or a blade, or is introduced laterally, wherein the second electronic unit is arranged so that a part of the resin penetrates underneath the second unit in step (D). In accordance with an eleventh illustrative embodiment of the present invention, the first illustrative embodiment is modified so that a resin layer is initially deposited on a bottom surface of a support of the second electronic unit.

In accordance with a twelfth illustrative embodiment of the present invention, the first illustrative embodiment is modified so that a second solid layer is provided on the filler material before pressure is applied thereto. In accordance with a thirteenth illustrative embodiment of the present invention, the first illustrative embodiment is modified so that the protective film has an adhesive surface or a heat reactivatable surface which, once applied against a rear face of the first electronic unit, adheres to the rear face of the first electronic unit. In accordance with a fourteenth illustrative embodiment of the present invention, the first illustrative embodiment is modified so that the protective film has limited dimensions so that the protective film does not extend underneath most of the second electronic unit. In accordance with a fifteenth illustrative embodiment of the present invention, the third illustrative embodiment is further modified so that the protective film has the general shape of a slit ring.

In accordance with a sixteenth illustrative embodiment of the present invention, the third illustrative embodiment is modified so that the protective film is formed of two parts, wherein at least one of the two parts is generally U-shaped. In accordance with a seventeenth illustrative embodiment of the present invention, the second illustrative embodiment is modified so that a first part of the filler material is formed by a resin provided underneath the second electronic unit while the second electronic unit is raised relative to the first solid layer or turned onto a top side thereof, and a second part of the filler material is then provided on the second electronic unit that is folded down or turned onto a bottom side thereof so as to be located on the first part of the filler material. In accordance with an eighteenth illustrative embodiment of the present invention, the sixth illustrative embodiment is modified so that a first part of the filler material is formed by a resin provided underneath the second electronic unit while the second electronic unit is raised relative to the first solid layer or turned onto a top side thereof, and a second part of the filler material is then provided on the second electronic unit that is folded down or turned onto a bottom side thereof so as to be located on the first part of the filler material.

In accordance with a nineteenth illustrative embodiment of the invention, the second illustrative embodiment is modified so that the filler material is formed by at least one resin, wherein the at least one resin is spread out using a roller or a blade, or is introduced laterally, wherein the second electronic unit is arranged so that a part of the at least one resin penetrates underneath the second electronic unit in step (C). In accordance with a twentieth illustrative embodiment of the present invention, the sixth illustrative embodiment is modified so that the filler material is formed by at least one resin, wherein the at least one resin is spread out using a roller or a blade, or is introduced laterally, wherein the second electronic unit is arranged so that a part of the at least one resin penetrates underneath the second electronic unit in step (E). In accordance with a twenty-first illustrative embodiment of the present invention, the second illustrative embodiment is modified so that a resin layer is initially deposited on a bottom surface of a support of the second electronic unit. In accordance with a twenty-second illustrative embodiment of the present invention, the sixth illustrative embodiment is further modified so that a resin layer is initially deposited on a bottom surface of a support of the second electronic unit.

In accordance with a twenty-third illustrative embodiment of the present invention, the second illustrative embodiment is modified so that a second solid layer is provided on the filler material before pressure is applied thereto. In accordance with a twenty-fourth illustrative embodiment of the present invention, the sixth illustrative embodiment is modified so that a second solid layer is provided on the filler material before pressure is applied thereto. In accordance with a twenty-fifth illustrative embodiment of the present invention, the second illustrative embodiment is modified so that the protective film has an adhesive surface, or heat reactivatable surface, which, once applied against a rear face of the first electronic unit, adheres to the rear face of the first electronic unit. In accordance with a twenty-sixth illustrative embodiment of the present invention, the sixth illustrative embodiment is modified so that the protective film has an adhesive surface, or heat reactivatable surface, which, once applied against a rear face of the first electronic unit, adheres to the rear face of the first electronic unit. In accordance with a twenty-seventh illustrative embodiment of the present invention, the second illustrative embodiment is modified so that the protective film has limited dimensions so that the protective film does not extend underneath most of the second electronic unit. In accordance with a twenty-eighth illustrative embodiment of the present invention, the sixth illustrative embodiment is modified so that the protective film has limited dimensions so that the protective film does not extend underneath most of the second electronic unit.

In accordance with a twenty-ninth illustrative embodiment, in accordance with the present invention, the second illustrative embodiment is modified so that the protective film is formed of a single part having at least one slit starting from the aperture made in the single part and the aperture has smaller dimensions than those of the first electronic unit. In accordance with a thirtieth illustrative embodiment of the present invention, the first illustrative embodiment is modified so that the protective film is formed of two parts that are each L-shaped. In accordance with a thirty-first illustrative embodiment of the present invention, the third illustrative embodiment is modified so that the protective film is formed of two parts that are each L-shaped.

More generally, however, the present invention concerns a method of manufacturing complex electronic cards, each including an electronic device or assembly formed of a first electronic unit at least partially arranged in a window in a solid bottom layer of the card and a second electronic unit, incorporated in the body of the card, at least partially formed by a resin provided on the solid bottom layer. In order to prevent the resin from flowing into a slit between the lateral wall of the window and the second unit inserted therein, a protective film is arranged to cover the edge of the rear face of the first unit and a zone peripheral to the aperture in the solid layer. According to the invention, the electronic device or assembly is first formed and then placed on the bottom solid layer. The protective film is arranged between the two units after or when the electronic device or assembly is formed. Therefore, according to the invention, the protective film is formed, for example, of several parts having respective profiles that define an aperture into which the electrical connection between the two electronic units passes. In another embodiment, the protective film is formed of a single part having at least one slit starting from an aperture made in the part and provided to allow the electrical connection to pass therethrough. In another embodiment of the invention, the protective film has flaps at the edge of the aperture and is assembled to the solid bottom layer prior to addition of the electronic device or assembly.

BRIEF DESCRIPTION OF THE DRAWINGS

Other features and advantages of the electronic card manufacturing method according to the invention will also appear from the following detailed description of implementation modes of this method, this description being made with reference to the annexed drawings, given by way of non-limiting example and in which.

DETAILED DESCRIPTION OF THE INVENTION

With reference to FIGS. 1 to 5, a first implementation mode of an electronic card manufacturing method according to the invention will be described below.

Figure 1:
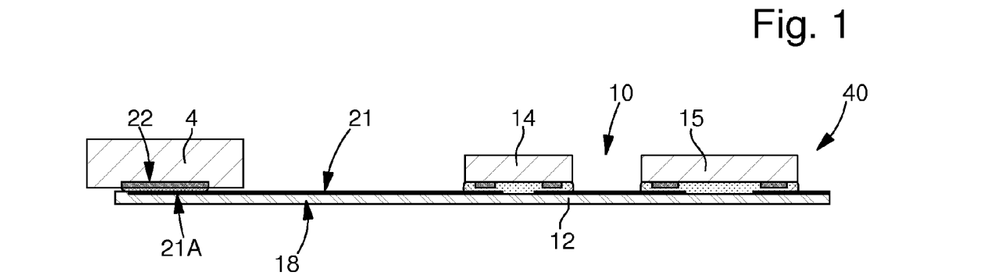
FIG. 1 shows a first embodiment of the electronic device incorporated in each card manufactured in accordance with the method of the invention.

In a preliminary step of this card manufacturing method, a first electronic unit 4 is assembled to a second electronic unit 10 to form electronic assembly or device 40. Electronic unit 10 is formed of a PCB type support 12 at the surface of which various components 14, 15 and 16 are arranged. These electronic circuits can be formed of any type of component and may have various functions. Component 14 can for example be a micro-processor, component 15 a display and component 16 a battery. It will be noted that the second electronic unit 10 can also, in a variant, form a battery or, in another variant, form an antenna. It will also be noted that the first electronic unit can be formed by a single external electric contact pad connected to an internal electronic unit of the card.

PCB 12 can be rigid or flexible. This support 12 is extended by a tongue 18 which is flexible, or at least capable of undergoing elastic deformation. Conductive paths 20 and 21 for establishing electrical connections between unit 10 and unit 4 are arranged on tongue 18. For this purpose, unit 4 has electrical connection pads 22 to which end pads 20a and 21A of paths 20 and 21 are electrically connected, particularly by tin welding or using a conductive adhesive. The tin can be deposited beforehand in the form of a thin film at the surface of contact pads 22. It will be noted that, according to the terminology used for this description of the invention, tongue 18 fitted with conductive paths forms an electrical connection between the first electronic unit 4 and the second electronic unit 10. It will be noted that the electrical connection described here is an advantageous example, but that any type of electrical connection between two electronic units known to those skilled in the art can be envisaged. In particular, more than two conductive paths or electrical connections can be provided between the two units. Tongue 18 can act as a support for a large number of electric connection paths between the two electronic units.

Figure 2:
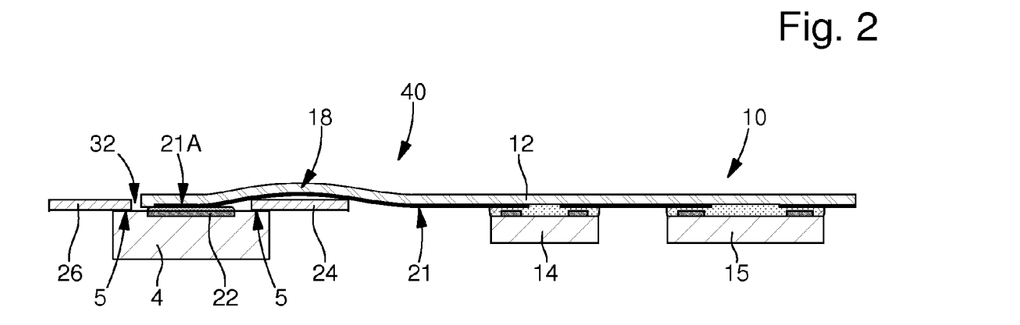
FIG. 2 shows the electronic assembly or device of FIG. 1 assembled with a protective film.
Figure 3:
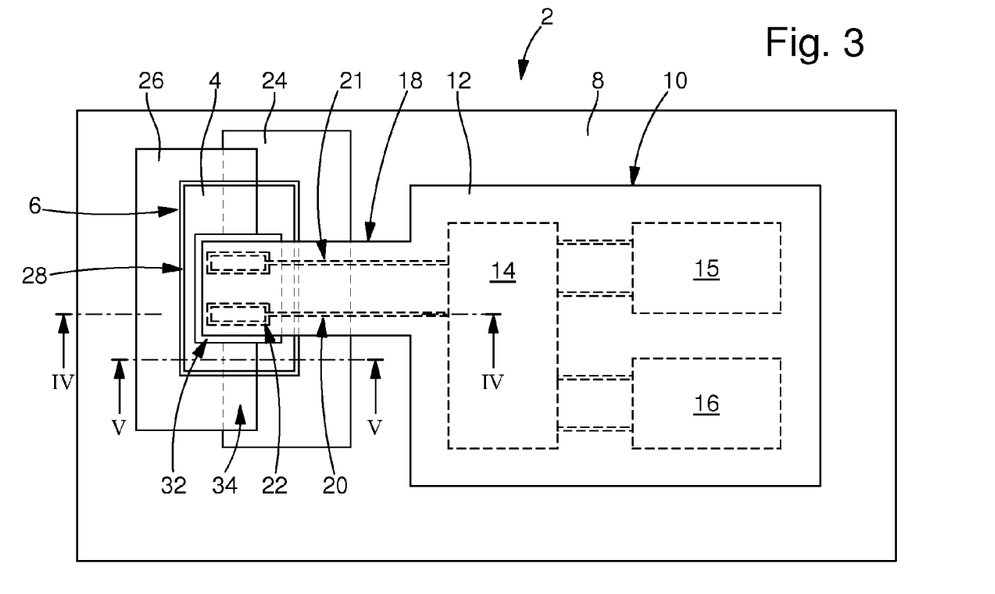
FIG. 3 is a top view of an electronic card according to the invention in an intermediate state during the manufacturing method of the invention.

After electronic device 40 has been formed, a protective film in two parts 24 and 26 is provided, the respective profiles of the parts defining, when assembled, a central aperture 32 into which electrical connection 18 passes, the aperture having smaller dimensions than those of first electronic unit 4. The two part protective film is arranged between the first and second electronic units 4 and 10, with electrical connection 18 passing through aperture 32. In the variant shown, the two parts have a general U shape. In another variant, only one of the two parts is U-shaped or both parts are L-shaped. The protective film has a zone peripheral to aperture 32 which is applied against the outer edge 5 of the rear face of first electronic unit 4. Protective film 24, 26 then extends into a zone peripheral to first unit 4 as shown in FIG. 2. The function of the protective film will be described below.

Electronic devices 40 fitted with the protective film are then taken to an electronic card production equipment or facility where several cards or inlets are generally manufactured simultaneously in the form of a plate or sheet. In the equipment or facility, a first solid layer is provided, the layer having at least one window 6 provided for each card and intended to receive at least partially the first unit 4 of electronic device 40. Each unit 4 is thus placed in a window 6 in solid layer 8. The protective film is then applied against the peripheral zone of window 6 so as to close any slit 28 between the lateral wall 30 of the window and first unit 4. To ensure that slit 28 is entirely closed by the protective film, the two parts 24 and 26 thereof have a zone 34 where the parts are superposed, part 26 having a region that partially covers part 24. In a variant, it is, however, possible to omit the overlapping zone, but to assembly the two parts properly side by side without leaving any space between them.

In a subsequent step, a filler material 42 is provided on first solid layer 8 and on the protective film, and pressure is for example applied to the filler material which is then in a non solid state, to form a layer of the electronic cards being manufactured, with the filler material surrounding electrical connection 18.

Figure 4:
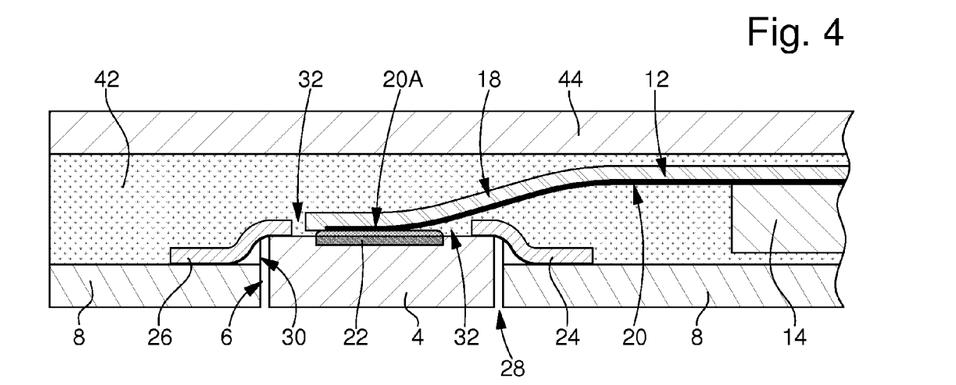
FIG. 4 is a cross-section along the line IV-IV of FIG. 3 with the electronic card in a finished or semi-finished state.
Figure 5:
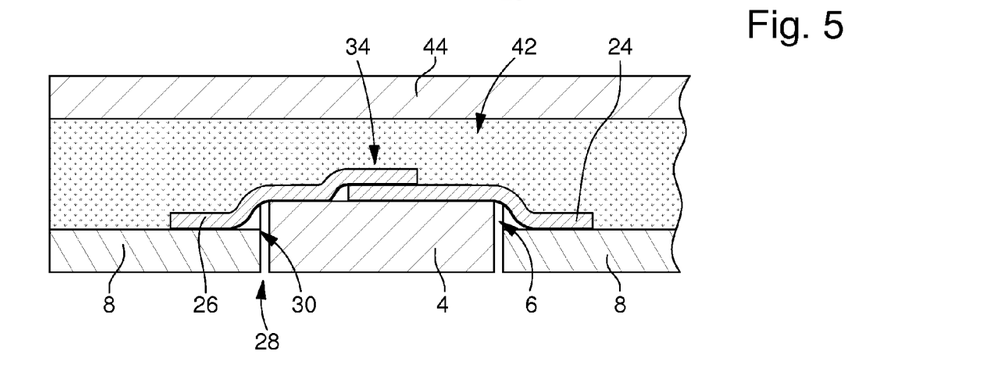
FIG. 5 is a cross-sectional view along the line V-V of FIG. 3 with the electronic card in a finished or semi-finished state.

In the variant shown in FIGS. 4 and 5, before pressure is applied to filler material 42, a second solid layer 44 is provided on the filler material. Preferably, the protective film includes an adhesive or heat-reactivatable surface allowing the protective film to be fixed firstly to the rear face of unit 4 and/or the protective film to be bonded to the top surface of solid layer 8. The fact that the protective film is in two or more parts means that it can easily be arranged at the edge of the rear face of electronic unit 4 while defining an aperture 32 that allows electrical connection 18 to pass through. Owing to this feature, it is thus possible to arrange the protective film properly after electronic device 40 has been formed.

It will be noted that the electronic device can include more than two units, in particular at least two units at least partially arranged in respective windows in one or two solid layer(s) so as to be visible.

Figures 6A, 6B:
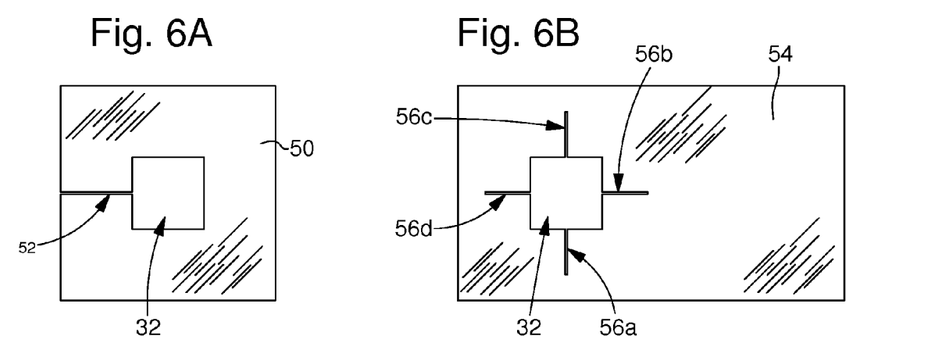
FIGS. 6A and 6B illustrate respectively two variants of a protective film according to the invention.

FIGS. 6A and 6B show two variants of another embodiment of the protective film which also satisfies the objective of the present invention. Protective film 50 of FIG. 6A is formed of a single part defining a central aperture 32 and having a slit 52 which passes through film 50 from aperture 32 as far as the external edge of the film. It is thus of the slit ring type. Again, so as to be able to arrange an area of film 50 peripheral to aperture 32 against the outer edge of the rear face of unit 4, aperture 32 has smaller dimensions than those of unit 4. The electrical connection 18 can easily be arranged in aperture 32 by inserting connection 18 into slit 52, and then moving it until it is located in aperture 32. Next, film 50 is correctly placed against the rear face of unit 4 in a similar way to the arrangement shown in FIGS. 2 and 4.

Protective film 54 of the variant shown in FIG. 6B differs in that a plurality of slits 56a to 56d is arranged at the periphery of aperture 32. These slits do not pass through film 54 as far as the outer edge thereof. They can therefore define parts peripheral to aperture 32, which can easily be folded outside the general plane of film 54 and thus allow an electronic unit, of larger dimensions than those of aperture 32, to pass through. To arrange protective film 54 between the first and second units 4 and 10 of an electronic device 40 in accordance with the present invention, unit 4 is pushed through aperture 32 moving aside the parts peripheral to the aperture 32 located between slits 56a to 56d. These peripheral parts thus undergo elastic deformation and return into the general plane of protective film 54 once unit 4 has passed through. The electrical connection 18 is then in aperture 32. So as to limit as far as possible any flow of resin into any slit or generally of any filler material deposited when the card body is being formed, the slits preferably have a minimum or zero width. "Slit" therefore means in particular making a simple cut in the protective film, particularly along a straight line portion.

The filler material provided to form the core of the card or an internal layer of the card is preferably formed by a resin deposited in viscous liquid state or in the form of a hot melt solid which is then at least partially melted so as to coat second electronic unit 10. According to a preferred implementation of the step of forming the core or internal layer of the card, firstly the second units 10 are rotated by elastically folding electrical connection 18, units 10 then being turned onto their top side on the other side of aperture 6 relative to the side provided for these units in the centre of the finished card. In a variant, units 10 are simply raised by suitable means and placed for example momentarily in a substantially vertical position. Next, a first part of the filler material is placed on bottom solid sheet 8, so that this first resin part at least partly covers the areas of the layer 8 where units 10 will eventually be arranged. Then, electronic units 10 are folded down or rotated again onto the bottom side thereof and placed on the first part of the filler material deposited beforehand. A second part of the filler material is then placed on units 10 so that the filler material completely coats the units and most of electrical connection 18. This method ensures that the filler material is present underneath components 14 to 16 of unit 10. This thus avoids some parts of bottom layer 8 not being coated with resin; which could then cause subsequent surface deformation problems for the finished card.

According to an alternative implementation of the method of the invention, in particular in the situation described with reference to FIGS. 1 to 5, the resin is essentially provided during a single same step and then spread out by using a roller or blade in one direction which ensures that part of the resin thereby spread out penetrates beneath support 12 of unit 10. This is made easier because the electronic components of unit 10 are located underneath the support. Thus, support 12 is initially located at some distance from solid layer 8 and a resin in a viscous liquid state easily penetrates beneath and also partly above the support during the step of forming a resin layer. It will be noted here that, in a variant where the electronic device 40 is manufactured so that the components of the second unit 10 are located above support 12 once the first unit 4 has been arranged in the aperture of the bottom layer, means can be provided to assist the flow of part of the resin underneath support 12. By way of non-limiting example, this support can have small projecting portions thus creating an empty space between the support and the bottom solid layer. Apertures can also be provided in support 12 to encourage the flow of part of the resin underneath the support. In a variant, support 12 can have a raised end part, particularly defining an inclined plane. The resin is then spread out by a roller or a blade in a direction that tends to lift the second internal electronic units, the horizontally pushed resin pressing against these raised parts relative to the general plane of support 12 and thus exerting an upward thrust. In a variant, the resin is introduced laterally between the two solid layers 8 and 44, particularly by injection into a mould.

According to another alternative implementation of the method according to the invention, in the aforementioned case where support 12 of the second electronic unit 10A is provided underneath the electronic components of the second unit, a resin film 60 is deposited beforehand underneath support 12. This resin film may be similar in nature to a resin film 62 deposited underneath protective film 50 (FIG. 7).

Figure 7:
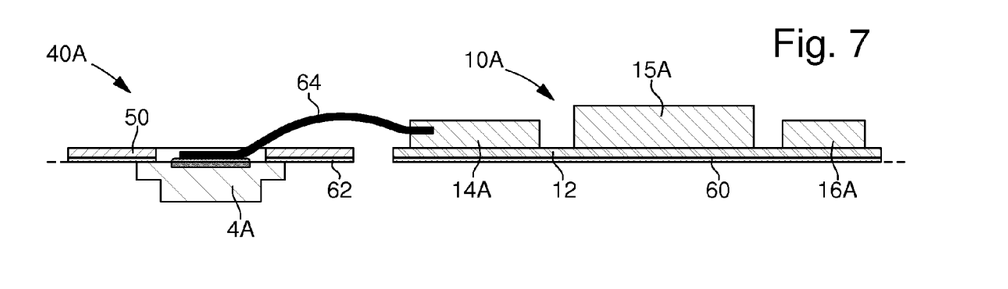
FIG. 7 shows schematically a second embodiment of an electronic device incorporated into each card manufactured in accordance with the method of the invention.
Figure 8:
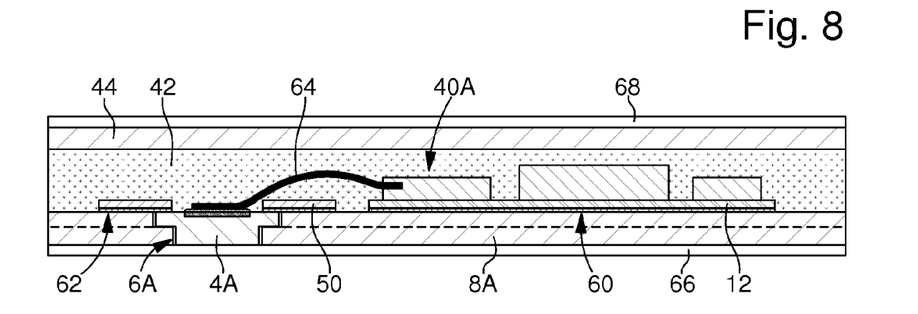
FIG. 8 is a cross-sectional view of a card obtained via the method according to the invention and incorporating the electronic device of FIG. 7.

According to the embodiment of the electronic device 40A of FIG. 7, the electrical connection 64 between units 4a and 10A is formed by metal tongues, which come out of module 14A. These metal tongues can be deformed and allow protective film 50 to be easily arranged against the rear face of unit 4A. It will be noted that unit 4A has a lateral wall with a recess. As shown in FIG. 8, electronic device 40A is then arranged on a solid layer 8A having apertures 6A with steps against which the top part of unit 4A rests. Solid layer 8A can be formed of two layers laminated to each other and each having an aperture of different dimensions to define a housing having a cross-sectional profile matching that of unit 4A. In the embodiment of a card according to the invention shown in FIG. 8, two transparent external films 66 and 68 are finally added. It will be noted that transparent film 66 covers electronic unit 4A. The latter forms, for example, a light sensor, a solar sensor, or a light emission source, in particular within the infra-red range. Unit 4A can also define an electronic display visible through transparent film 66.

It will also be noted that resin film 60 located between layer 8A and support 12 can be identical to resin 42 forming the internal layer of the card. Adhesive film 60 can be made to adhere to the bottom layer by applying heat through the layer.

Figure 9A:
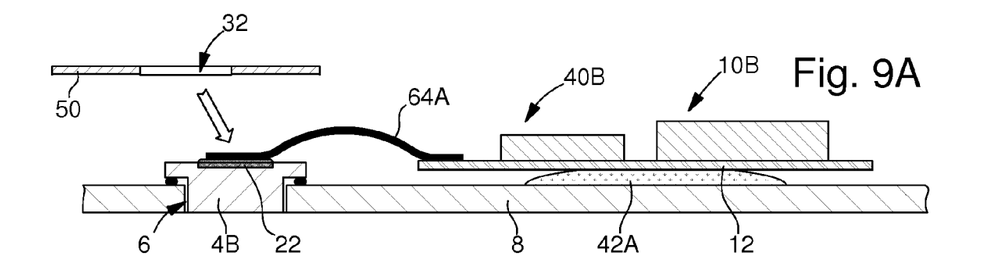
FIG. 9A shows schematically one step of a second implementation mode of the method according to the invention.
Figure 9B:
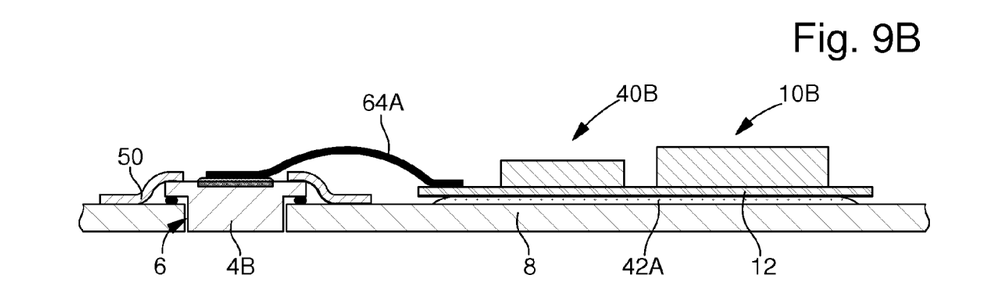
FIG. 9B partially shows the intermediate product resulting from the step shown in the diagram of FIG. 9A.
Figure 10:
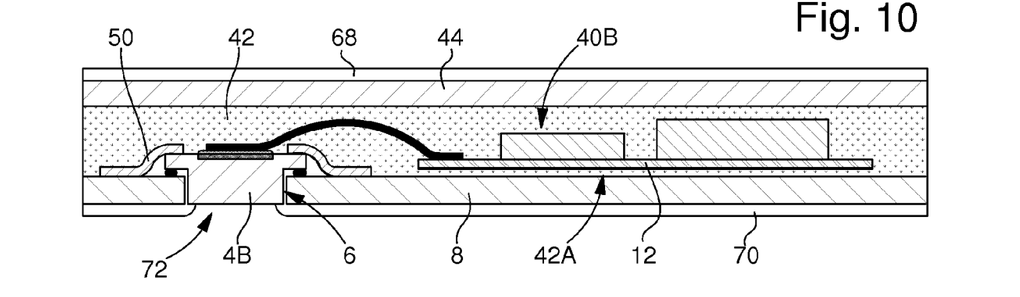
FIG. 10 shows a cross-section of a variant of an electronic card obtained via the method according to the invention.

With reference to FIGS. 9A, 9B and 10 a second implementation mode of the card manufacturing method according to the present invention will now be described. This essential difference between this second implementation mode and the first mode is a variation in the sequence of steps of the method. As shown schematically in FIG. 9A, electronic assembly or device 40B is firstly provided on bottom solid layer 8 and unit 4B is inserted into cavity 6 provided in the layer. It will be noted here that one part 42A of the resin, intended to form an internal layer in which electronic unit 10B is incorporated, is provided before device 40B or, in a variant, this resin part 42A is added while unit 10B is raised or turned over, as was described previously. Once the first unit 4B is partially housed inside aperture 6 of solid layer 8, protective film 50 is provided and set in place as shown in FIG. 9B, by inserting the electrical connection 64A in aperture 32 of film 50, through slit 52 provided in the film (FIG. 6A). It will be noted that unit 4B can be secured to the layer by dots of adhesive before the protective film is arranged. This film is formed in this variant of a single part having at least one slit starting from an aperture made in the part, the dimensions of the aperture being smaller than those of first unit 4B. Protective film 50 is set in place so that it covers a peripheral zone of window 6 and the outer edge of the rear face of first unit 4B where electrical connection pads 22 are arranged. This arrangement according to the invention allows any slit between the lateral wall of each window provided in solid layer 8 and the first unit 4B placed in the window to be closed. As in the first implementation, the protective film can be formed of several parts with respective profiles which, when assembled on the bottom solid layer 8, define an aperture into which the electrical connection 64A passes.

Then, as in the first implementation mode of the invention, a filler material, particularly a resin, is deposited on the first solid layer 8 and protective film 50, and the filler material is spread out in a non solid state to form a layer of the electronic cards, the filler material then covering the second electronic unit 10B.

The card variant shown in FIG. 10 differs in particular from that of FIG. 8 in that the bottom transparent film 70 has a window 72 arranged opposite the external surface of the first unit 4B. Electronic unit 4B here forms for example a fingerprint sensor. This latter variant has the advantage of closing any slit between unit 4B and the lateral wall of window 6 on the side of the external surface of solid layer 8.

It will be noted that, in the various card embodiments described above, the dimensions of the protective film are limited such that it does not extend underneath the whole of the second electronic unit incorporated in the resin layer. In particular, the protective film has reduced dimensions and is not superposed on the second internal unit incorporated in the resin layer. This thus avoids having a film covering most of the bottom solid layer and thus forming an interface between the resin layer and the bottom solid layer. Even if the protective film has adhesive or heat-reactivatable surfaces, the adherence of the film to the bottom solid layer may be reduced. A protective film passing through the card could thus cause peeling problems for the bottom solid layer.

With reference to FIGS. 11 and 12A to 12E, a third implementation mode of the electronic card manufacturing method according to the present invention will be described below. This implementation is particularly suited to automated production and provides cards of very high quality, without any risk of the protective film peeling off.

Figure 11:
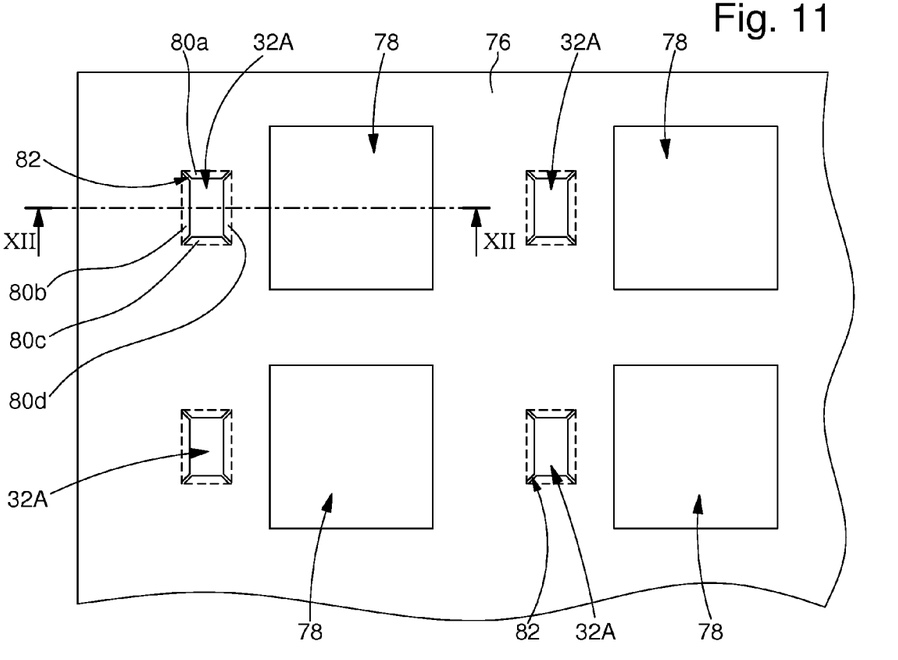
FIG. 11 is a top view of a protective film for producing a batch of cards in accordance with a third implementation mode of the method of the invention.

Protective film 76 is made for several batch manufactured cards, in the form of a plate from which the cards are then cut out. This film 76 has apertures 32A for the electrical connections 64, of electronic assemblies or devices 40C incorporated in the cards, to pass through, and preferably apertures 78 in the zones provided for the second electronic units 10C. Each aperture 32A has four flaps 80*a* to 80*d* defined by four slits 82 provided in the corners of the aperture 32A. It will be noted that the protective film is very thin here.

In a first step of the card production method, film 76 is assembled by lamination, preferably hot lamination, with a solid layer 8 having apertures 6 for receiving respectively the first units 4 of the prefabricated electronic assemblies or devices 40C. This solid layer and the protective film thus adhere securely to each other. Apertures 32A are centred on apertures 6. Flaps 80*a*-80*d* are then located along the perimeter of each aperture 6 in the general plane of protective film 76. It will be noted that the slits can be made after the lamination step, particular in the case of hot lamination.

Figure 12A:
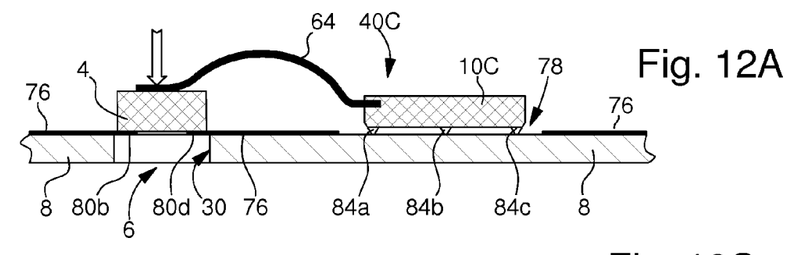
FIGS. 12A, 12B, 12C, 12D and 12E show a series of steps occurring in the aforementioned third implementation mode.
Figure 12B:
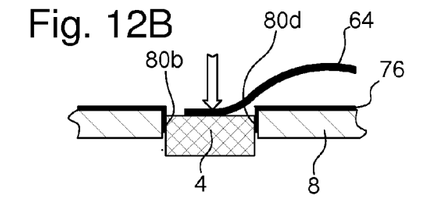
Figure 12C:
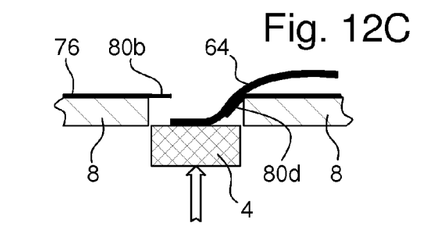
Figure 12D:
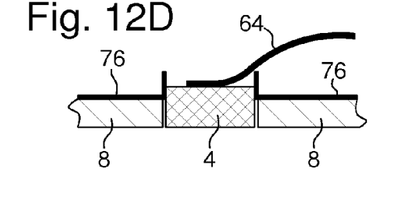
Figure 12E:
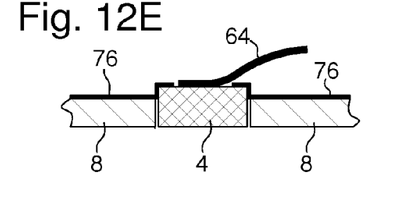

Next, the electronic devices 40C are placed on the structure formed of bottom layer 8 and protective film 76 (FIG. 12A) and the first units 4 are pushed into apertures 6 by folding flaps 80*a*-80*d* against the lateral wall 30 of the apertures (FIG. 12B). Units 4 are lowered sufficiently to release the flaps which then move at least partially back up towards the general plane of film 76 (FIG. 12C). Finally, units 4 are moved up inside apertures 6 to the level anticipated for the finished cards (FIG. 12D). The flaps are then abutting against the lateral surface of unit 4. To close the slit securely between unit 4 and wall 30 of aperture 6 in which it is inserted, the ends of the flaps are preferably folded against the outer edge of the rear face of unit 4 (FIG. 12E). These folded ends are preferably bonded against the rear face. Again slits 82 may have almost zero width. Thus when the resin is subsequently deposited on film 76, electronic units 100 and their respective electrical connections 64 to units 4, the resin will not flow along walls 30 of windows 6. The subsequent steps are similar to those of the other implementations modes of the method, as are the variants that can be envisaged for these subsequent steps. They will not be described again in detail here.

In a variant that is not shown, the first electronic unit has a narrowed portion in the internal part thereof, this narrowed portion defining, on the top internal surface of solid layer 8, a horizontal peripheral surface of the first unit substantially in the plane of the top internal surface while the height of the first first unit can be considerably greater than the thickness of the solid layer. When the first unit is moved up into its final position, the flaps of the protective film are then located on the peripheral surface of the first unit in a horizontal position. The slits in the corners of the aperture can thus be properly closed since the flaps are located in the general plane of the protective film; which guarantees a high level of sealing when the filler material passes in its non solid state, in particular a resin in a viscous liquid state.

It will be noted that, in the variant shown in FIG. 12A, the bottom surface of internal unit 10C has bumps or raised portions which leave a space free between the internal unit and the top surface of layer 8 so as to allow the resin to fill this space when an internal layer of the cards is being formed and thus form a resin film that securely fixes unit 100 to layer 8.

What is claimed is:

1. A method of manufacturing electronic cards, each card including at least a first electronic unit at least partially arranged in a window in a solid layer of the card, and a second electronic unit electrically connected to the first electronic unit, wherein the method includes the following steps in series:

(A) forming an electronic device, or an electronic assembly, by making an electrical connection at least between a first electronic unit and a second electronic unit;

(B) providing a first solid layer having at least one window, wherein the at least one window is provided to at least partially receive the first electronic unit, and placing the first electronic unit of the electronic device, or the electronic assembly, in the at least one window;

(C) providing a first protective film formed of several parts having respective profiles that, when assembled, define a first aperture into which the electrical connection passes, wherein the first aperture has smaller dimensions than those of the first electronic unit, or providing a second protective film formed of a single part having at least one slit starting from a second aperture made in the single part, wherein the dimensions of the second aperture are smaller than those of the first electronic unit, and placing the first protective film, or the second protective film, so as to cover the first solid layer in a zone peripheral to the at least one window and at least a lateral surface of the first electronic unit, to close any slit between the lateral wall of the at least one window and the first electronic unit, or to cover the first solid layer in the zone peripheral to the at least one window and an outer edge of a rear face of the first electronic unit to close any slit between the lateral wall of the at least one window and the first electronic unit; and (D) at least on the protective film, providing a filler material and forming a card by the filler material that is at least partially in a non solid phase, wherein the filler material at least partially covers the electrical connection of the electronic device or the electronic assembly.

2. A method of manufacturing electronic cards, each card including at least a first electronic unit at least partially arranged in a window in a solid layer of the card, and a second electronic unit electrically connected to the first electronic unit, wherein the method includes the following series of steps in series:

(A) first forming an electronic device, or an electronic assembly, by making an electrical connection at least between a first electronic unit and a second electronic unit, and then providing a protective film having an aperture, or arranged to define the aperture, wherein the dimensions of the aperture are smaller than those of the first electronic unit, and arranging the protective film between the first electronic unit and the second unit with the electrical connection passing through the aperture;

(B) providing a first solid layer having at least one window, wherein the at least one window is provided to at least partially receive the first electronic unit, and providing the formed electronic device, or electronic assembly, with the protective film, and placing the first electronic unit in the at least one window and the protective film partially on the first solid layer at a periphery of that at least one window and, when not previously performed, partially against a lateral surface of the first electronic unit, or against an outer edge of a rear face of the first electronic unit, so as to close any slit between the lateral wall of the at least one window and the first electronic unit; and (C) at least on the protective film, providing a filler material and forming a card layer by the filler material that is at least partially in a non solid phase, wherein the filler material at least partially covers the electrical connection of the electronic device or electronic assembly.

3. The electronic card manufacturing method according to claim 2, wherein said protective film is formed of several parts, having respective profiles provided to define, when assembled, the aperture into which said electrical connection passes and the aperture has smaller dimensions than those of the first electronic unit.

4. The electronic card manufacturing method according to claim 1, wherein said protective film has the general shape of a slit ring.

5. The electronic card manufacturing method according to claim 1, wherein said protective film is formed of two parts, wherein at least one of the two parts is generally U-shaped.

6. A method of manufacturing electronic cards, each card including at least a first electronic unit at least partially arranged in a window in a solid layer of the card, and a second electronic unit electrically connected to the first electronic unit, wherein the method includes:

a plurality of steps that include a first group of steps and a second group of steps in series, wherein the first group of steps include (A) forming an electronic device, or an electronic assembly by making an electrical connection at least between a first electronic unit and a second electronic unit; and (B) forming a structure including a protective film provided with at least one aperture, wherein the at least one aperture has smaller dimensions than those of the first electronic unit and the at least one aperture has flaps at a periphery thereof, and forming a first solid layer having at least one window that at least partially receives the first electronic unit, wherein the protective film is assembled to the first solid layer with the at least one aperture centered on the at least one window;

wherein the first group of steps are followed by the second group of steps, and the second group of steps include in series (C) providing the structure and the electronic device, or the electronic assembly, to a card production equipment or to a card production facility, and placing the first electronic unit opposite the at least one aperture, then pushing the first electronic unit into the at least one window by folding the flaps in a direction of a lateral wall of the at least one aperture until the flaps are released and then move the flaps back up at least partially towards a general plane of the protective film;

(D) moving the first electronic unit back up towards the at least one aperture so that the flaps are applied against a lateral surface of the first electronic unit, or a rear face of the first electronic unit, so as to close any slit between the lateral wall of the at least one window and the first electronic unit, wherein the electrical connection passes through the at least one aperture; and (E) at least on the protective film, providing a filler material and forming a card layer by the filler material that is at least partially in a non solid phase, wherein the filler material at least partially covers the electrical connection of the electronic device or electronic assembly.

7. The electronic card manufacturing method according to claim 6, wherein said protective film and said first solid layer are laminated together.

8. The electronic card manufacturing method according to claim 6, wherein said protective film initially has a plurality of apertures respectively centered on a plurality of windows in the first solid layer to which said protective film is assembled, wherein said structure is provided for forming a batch of cards, wherein each incorporates one of a plurality of the an electronic device or the electronic assembly.

9. The electronic card manufacturing method according to claim 1, wherein a first part of the filler material is formed by a resin provided underneath the second electronic unit while the second electronic unit is raised relative to the first solid layer or turned onto a top side thereof, and a second part of the filler material is then provided on said second electronic unit that is folded down or turned onto a bottom side thereof so as to be located on the first part of the filler material.

10. The electronic card manufacturing method according to claim 1, wherein the filler material is formed by at least one resin, wherein the resin is spread out using a roller or a blade, or is introduced laterally, wherein the second electronic unit is arranged so that a part of the resin penetrates underneath said second unit in step (D).

11. The electronic card manufacturing method according to claim 1, wherein a resin layer is initially deposited on a bottom surface of a support of the second electronic unit.

12. The electronic card manufacturing method according to claim 1, wherein a second solid layer is provided on said filler material before pressure is applied thereto.

13. The electronic card manufacturing method according to claim 1, wherein said protective film has an adhesive surface or a heat reactivatable surface which, once applied against a rear face of the first electronic unit, adheres to the rear face of the first electronic unit.

14. The electronic card manufacturing method according to claim 1, wherein said protective film has limited dimensions so that said protective film does not extend underneath most of the second electronic unit.

15. The electronic card manufacturing method according to claim 3, wherein said protective film has the general shape of a slit ring.

16. The electronic card manufacturing method according to claim 3, wherein said protective film is formed of two parts, wherein at least one of the two parts is generally U-shaped.

17. The electronic card manufacturing method according to claim 2, wherein a first part of the filler material is formed by a resin provided underneath the second electronic unit while the second electronic unit is raised relative to the first solid layer or turned onto a top side thereof, and a second part of the filler material is then provided on the second electronic unit that is folded down or turned onto a bottom side thereof so as to be located on the first part of the filler material.

18. The electronic card manufacturing method according to claim 6, wherein a first part of the filler material is formed by a resin provided underneath the second electronic unit while the second electronic unit is raised relative to the first solid layer or turned onto a top side thereof, and a second part of the filler material is then provided on the second electronic unit that is folded down or turned onto a bottom side thereof so as to be located on the first part of the filler material.

19. The electronic card manufacturing method according to claim 2, wherein the filler material is formed by at least one resin, wherein the at least one resin is spread out using a roller or a blade, or is introduced laterally, wherein the second electronic unit is arranged so that a part of the at least one resin penetrates underneath the second electronic unit in step (C).

20. The electronic card manufacturing method according to claim 6, wherein the filler material is formed by at least one resin, wherein the at least one resin is spread out using a roller or a blade, or is introduced laterally, wherein the second electronic unit is arranged so that a part of the at least one resin penetrates underneath the second electronic unit in step (E).

21. The electronic card manufacturing method according to claim 2, wherein a resin layer is initially deposited on a bottom surface of a support of the second electronic unit.

22. The electronic card manufacturing method according to claim 6, wherein a resin layer is initially deposited on a bottom surface of a support of the second electronic unit.

23. The electronic card manufacturing method according to claim 2, wherein a second solid layer is provided on said filler material before pressure is applied thereto.

24. The electronic card manufacturing method according to claim 6, wherein a second solid layer is provided on said filler material before pressure is applied thereto.

25. The electronic card manufacturing method according to claim 2, wherein said protective film has an adhesive surface, or heat reactivatable surface, which, once applied against a rear face of the first electronic unit, adheres to the rear face of the first electronic unit.

26. The electronic card manufacturing method according to claim 6, wherein said protective film has an adhesive surface, or heat reactivatable surface, which, once applied against a rear face of the first electronic unit, adheres to the rear face of the first electronic unit.

27. The electronic card manufacturing method according to claim 2, wherein said protective film has limited dimensions so that said protective film does not extend underneath most of the second electronic unit.

28. The electronic card manufacturing method according to claim 6, wherein said protective film has limited dimensions so that said protective film does not extend underneath most of the second electronic unit.

29. The electronic card manufacturing method according to claim 2, wherein said protective film is formed of a single part having at least one slit starting from the aperture made in the single part and the aperture has smaller dimensions than those of the first electronic unit.

30. The electronic card manufacturing method according to claim 1, wherein said protective film is formed of two parts that are each L-shaped.

31. The electronic card manufacturing method according to claim 3, wherein said protective film is formed of two parts that are each L-shaped.

* * * * *